United States Patent [19]

Toyama et al.

[11] Patent Number: 5,262,342
[45] Date of Patent: Nov. 16, 1993

[54] METHOD OF MAKING A SEMICONDUCTOR MEMORY DEVICE HAVING ERROR CHECKING/CORRECTING FUNCTIONS

[75] Inventors: Tsuyoshi Toyama; Shinichi Kobayashi; Kenji Noguchi, all of Hyogo, Japan

[73] Assignee: Mitsubishi Denki Kabushiki Kaisha, Tokyo, Japan

[21] Appl. No.: 771,891

[22] Filed: Oct. 7, 1991

Related U.S. Application Data

[62] Division of Ser. No. 409,893, Sep. 20, 1989, abandoned.

[30] Foreign Application Priority Data

Nov. 4, 1988 [JP] Japan .................. 63-279573

[51] Int. Cl.⁵ .............................. H01L 21/70
[52] U.S. Cl. ........................... 437/52; 437/48
[58] Field of Search ................. 437/47, 48, 52; 357/23.5; 365/185, 178

[56] References Cited

U.S. PATENT DOCUMENTS

| | | | |
|---|---|---|---|
| 4,168,486 | 9/1979 | Legory | 340/146.1 |
| 4,335,459 | 6/1982 | Miller | 371/38 |
| 4,355,391 | 11/1982 | Alsop, IV | 371/37.8 |
| 4,358,889 | 11/1982 | Dickman et al. | 437/43 |
| 4,506,362 | 3/1985 | Morley | 371/13 |
| 4,517,732 | 5/1985 | Oshikawa | 437/43 |
| 4,617,664 | 10/1986 | Aichelmann, Jr. et al. | 371/38 |
| 4,651,406 | 3/1987 | Shimiza et al. | 437/43 |
| 4,715,036 | 12/1987 | Oakes | 371/37 |
| 4,822,750 | 4/1989 | Perlegos et al. | 437/43 |
| 4,833,096 | 5/1989 | Huang et al. | 437/43 |
| 4,862,462 | 8/1989 | Zulian | 371/38 |
| 4,903,268 | 2/1990 | Hidaka et al. | 371/40.1 |
| 4,945,068 | 7/1990 | Sugaya | 437/43 |
| 4,958,352 | 9/1990 | Noguchi et al. | 371/40.1 |

FOREIGN PATENT DOCUMENTS 59-5550  1/1984  Japan .
61-101857  5/1986  Japan .

OTHER PUBLICATIONS

Hilburn et al, "Microcomputers/Microprocessors: Hardware, Software, & Applications," Prentice-Hall, Inc., 1976, pp. 79–86.
Tocci, "Digital Systems Principles and Applications," Prentice-Hall, Inc., 1980, pp. 405–406, 417–418.
Marino, "Principles of Computer Design," Computer Science Press, 1986, pp. 294–305.
Williams, "Digital Technology Principles and Practices," Science Research Associates, Inc., 1977, pp. 355–357.
Herrick, "A PROM-based decoder detects and corrects errors," EDN, pp. 169–172, Jun. 20, 1980.
IBM Technical Disclosure Bulletin, vol. 27, No. 5, "Dynamic Random-Access Memories with On-Chip Error Checking and Correction", Oct. 1984.
D. Cioaca et al "A Million-Cycle CMOS 256K EEPROM", IEEE Journal of Solid-State Circuits, vol. SC-22, No. 5 (Oct. 1987) pp. 684–691.

Primary Examiner—Tom Thomas
Attorney, Agent, or Firm—Lowe, Price, LeBlanc & Becker

[57] ABSTRACT

A semiconductor memory device having error checking/correcting functions includes a circuit (10) for generating a code for error checking/correcting based on information externally supplied and linking the information and the code to be transmitted to a memory cell array (1), and another circuit (11) for error checking and correcting read-out information from the information and the code which are read-out from the memory cell array so as to output correct read-out information. The code word generating circuit (10) and the error checking/correcting circuit (11) are formed of a masked ROM integrated on the same semiconductor chip (100) as that of the memory cell array (1) in the memory device.

1 Claim, 8 Drawing Sheets

FAMOS CELL

FIG.2  PRIOR ART

| | D₁ | D₀ | P₁ | P₂ | P₃ | D₁ | D₀ |
|---|---|---|---|---|---|---|---|
| CODING | 0 | 0 | 0 | 0 | 0 | | |
| | 0 | 1 | 1 | 1 | 0 | | |
| | 1 | 0 | 1 | 0 | 1 | | |
| | 1 | 1 | 0 | 1 | 1 | | |
| DECODING | 0 | 0 | 0 | 0 | 0 | 0 | 0 |
| | 0 | 0 | 0 | 0 | 1 | 0 | 0 |
| | 0 | 0 | 0 | 1 | 0 | 0 | 0 |
| | 0 | 0 | 0 | 1 | 1 | 0 | 0 |
| | 0 | 0 | 1 | 0 | 0 | 0 | 0 |
| | 0 | 0 | 1 | 0 | 1 | 1 | 0 |
| | 0 | 0 | 1 | 1 | 0 | 0 | 1 |
| | 0 | 0 | 1 | 1 | 1 | 0 | 0 |
| | 0 | 1 | 0 | 0 | 0 | 0 | 0 |
| | 0 | 1 | 0 | 0 | 1 | 0 | 1 |
| | 0 | 1 | 0 | 1 | 0 | 1 | 1 |
| | 0 | 1 | 0 | 1 | 1 | 1 | 1 |
| | 0 | 1 | 1 | 0 | 0 | 1 | 1 |
| | 0 | 1 | 1 | 0 | 1 | 1 | 1 |
| | 0 | 1 | 1 | 1 | 0 | 1 | 1 |
| | 0 | 1 | 1 | 1 | 1 | 1 | 1 |
| | 1 | 0 | 0 | 0 | 0 | 0 | 0 |
| | 1 | 0 | 0 | 0 | 1 | 1 | 0 |
| | 1 | 0 | 0 | 1 | 0 | 0 | 0 |
| | 1 | 0 | 0 | 1 | 1 | 1 | 0 |
| | 1 | 0 | 1 | 0 | 0 | 1 | 0 |
| | 1 | 0 | 1 | 0 | 1 | 1 | 0 |
| | 1 | 0 | 1 | 1 | 0 | 1 | 0 |
| | 1 | 0 | 1 | 1 | 1 | 0 | 0 |
| | 1 | 1 | 0 | 0 | 0 | 1 | 1 |
| | 1 | 1 | 0 | 0 | 1 | 1 | 1 |
| | 1 | 1 | 0 | 1 | 0 | 1 | 1 |
| | 1 | 1 | 0 | 1 | 1 | 1 | 1 |
| | 1 | 1 | 1 | 0 | 0 | 1 | 1 |
| | 1 | 1 | 1 | 0 | 1 | 1 | 0 |
| | 1 | 1 | 1 | 1 | 0 | 0 | 1 |
| | 1 | 1 | 1 | 1 | 1 | 1 | 1 |

FIG.8A
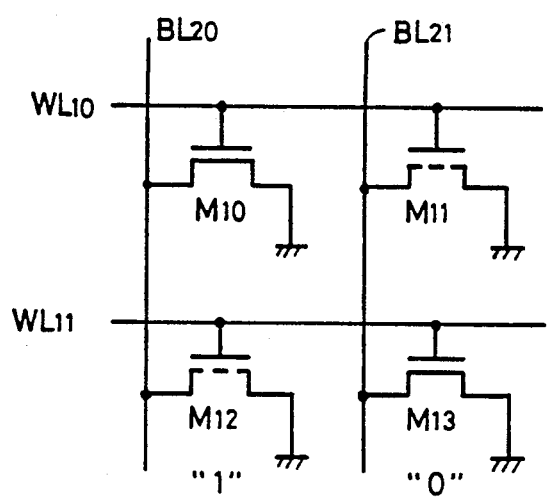
FIG.8B
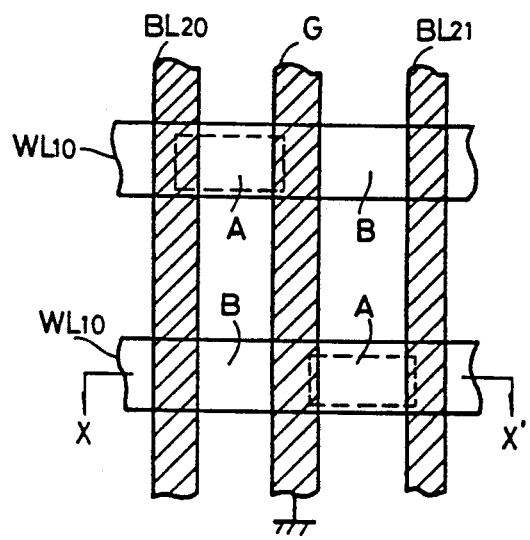
FIG.8C
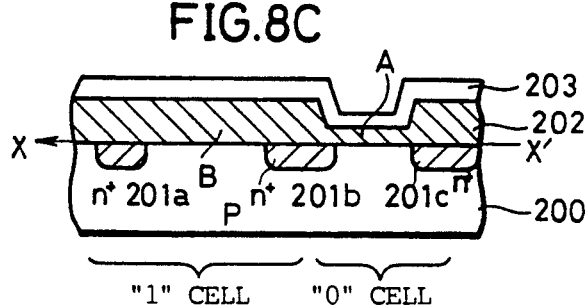
FIG.9(a)
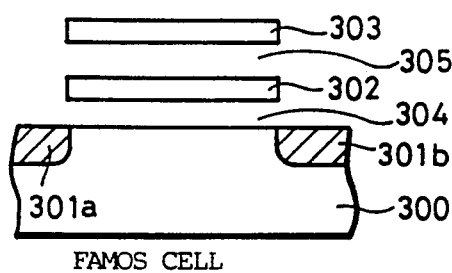
FAMOS CELL
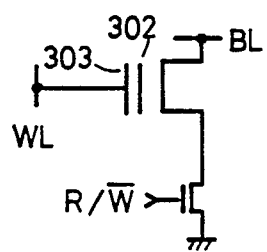
FIG.9(b)
FIG.10(a)
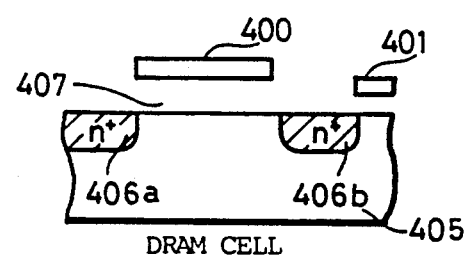
DRAM CELL
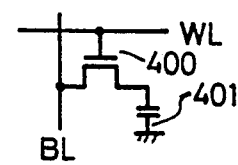
FIG.10(b)

METHOD OF MAKING A SEMICONDUCTOR MEMORY DEVICE HAVING ERROR CHECKING/CORRECTING FUNCTIONS

This application is a divisional of application Ser. No. 07/409,893 filed Sep. 20, 1989, now abandoned.

BACKGROUND OF THE INVENTION

1. Field of the Invention

The present invention relates to a semiconductor memory device, and more particularly to improvements of a circuit for error checking/correction and a circuit for generating a code word which can check/correct an error, comprised in a large capacity semiconductor memory device having error checking/correcting functions.

2. Description of the Background Art

As a semiconductor memory device such as EEPROM (an electrically writable and erasable non-volatile semiconductor device), DRAM (a dynamic random access memory) or SRAM (a static random access memory) has its capacity increased, the number of defective memory cells increases, and therefore it is considered that a conventional redundancy memory cell system cannot cope with such a situation. Further, it sometimes occurs during the operation of a semiconductor memory device that erroneous data are written in or read out due to latent defective cells which were not detected when the device was put on the market, noises and the like. Accordingly, the error checking and correcting functions of data have been recently added to a large capacity semiconductor memory device. First of all, a method of error checking/correcting of information will be described taking as an example Hamming code which is one of the linear codes commonly used.

First, a two-dimensional block code of a length n is considered. A code which regards as a code word all the series $w=(x_1, x_2, \ldots, x_n)$ satisfying the following linear simultaneous equations is called a linear code.

$$\begin{aligned} a_{11}x_1 + a_{12}x_2 + \ldots + a_{1n}x_n &= 0 \\ a_{21}x_1 + a_{22}x_2 + \ldots + a_{2n}x_n &= 0 \\ &\vdots \\ a_{m1}x_1 + a_{m2}x_2 + \ldots + a_{mn}x_n &= 0 \end{aligned} \quad (\text{mod. } 2)$$

$m < n$,
$x_i \in (0, 1)$,
$i = 1, \ldots, n$, $a_{ij}$ ($i=1, \ldots, n$; $j=1, \ldots, n$) is assumed to be a constant having 0 or 1, and an operation thereof is to be performed following Boolean algebra.

The above simultaneous equation is called a parity check equation, while the coefficient matrix of this parity check equation shown below is called a parity check matrix.

$$\begin{bmatrix} a_{11} & a_{12} & \ldots & a_{1n} \\ a_{21} & a_{22} & \ldots & a_{2n} \\ \ldots & \ldots & \ldots & \ldots \\ a_{m1} & a_{m2} & \ldots & a_{mn} \end{bmatrix} = \Delta H$$

In the parity check equation, variables which can be independently selected are called information bits, while variables to be determined according to the selected variables are called check bits.

Assuming a code is w, the parity check equation is expressed as follows.

$$Hw^T = 0 \quad (\text{mod. } 2)$$

Where, w is the above described code word, while T is a symbol representing transposition.

In the above described parity check matrix, the one taking the following form is particularly called a canonical parity check matrix.

$$H = m \Big\updownarrow \begin{bmatrix} \overset{\longleftrightarrow{m}}{I_m} & \overset{\longleftrightarrow{k}}{P} \end{bmatrix}$$

Where $I_m$ is a unit matrix of $m \times m$.

Here, the check bits comprise the first m bits ($x_1, x_2, \ldots, x_m$). The relation between the information bits and the check bits in the case of the canonical parity check matrix is given in the following expression.

$$(x_1 \ldots x_m) = (x_{m+1}, \ldots, x_n) P^T \quad (\text{mod. } 2)$$

Therefore, when information bits ($x_{m+1}, \ldots, x_n$) are arbitrarily selected, the check bits corresponding thereto are uniquely determined.

Corresponding to the above described canonical parity check matrix, the matrix shown below is called a generation matrix.

$$G = k \Big\updownarrow \begin{bmatrix} \overset{\longleftrightarrow{m_T}}{P} & \overset{\longleftrightarrow{k}}{I_k} \end{bmatrix}$$

For the linear code, a code word w is generated from the contents of the information bit $w_1$ by employing the generation matrix G as follows.

$$w = w_1 G \quad (\text{mod. } 2)$$

In the above parity check matrix H, when each column is non-0, and, no columns exist which are equal to each other, a code generated by the generation matrix G associated with the matrix H is called a Hamming code or a single error correction code of Hamming.

For the code word w,
$s = Hw^T$ (mod. 2) is called a syndrome "s" of the w. Since the syndrome s is 0 for an error-free code word w, if the syndrome s of a given code word is not 0, the code word includes an error. When the given code word includes a single error pattern as expressed below, $$e_i = (0, \ldots, 0, 1, 0 \ldots, 0),$$

the syndrome s is $$s = H(w + e_i)^T = He_i^T.$$

Namely, the syndrome s is equal to the i-th column of the parity check matrix H.

When the given code word is a Hamming code, each column of the check matrix H is non-0, and no columns exist which are equal to each other, so that information having a single error pattern has a syndrome s differing from each other. Accordingly, error checking and correction can be carried out by obtaining the syndrome of the given data and by adding the single error pattern corresponding thereto to the given information.

Correct data writing/reading in the semiconductor memory device is carried out by employing the above described code word which can correct/check an error. That is, in data writing, check bits are generated for the data externally given, and then, the check bits generated for the given write-in data are linked to the write-in data to be stored. In data reading, accessed memory cell information and the check bits linked thereto are both read to be a code word, and the error checking and correction based on the code word is carried out, thereby carrying out correct data reading. The configuration and operation of the semiconductor memory device having error checking/correcting functions according to the above described theory will now be described as follows.

FIG. 1 is a diagram illustrating the entire schematic configuration of a conventional semiconductor memory device having an error correcting function. Referring to FIG. 1, the conventional semiconductor memory device comprises a memory cell array 1 for storing information which is externally provided (hereinafter referred to as information bits), and a memory cell array 2 for checking which comprises a plurality of memory cells for storing checking information generated corresponding to the information bits of the memory cell array 1 (hereinafter referred to as check bits). The memory cell array 1 comprises the memory cells arranged in a plurality of rows and columns. The memory cell array for checking comprises a plurality of memory cells as well.

In order to select the memory cells of the memory cell array 1, there are provided an X decoder 3 for decoding an X address provided via X address input terminals 21a-21m to generate a row selecting signal, and a Y decoder 4 for decoding a Y address provided via Y address input terminals 22a-22n to generate a column selecting signal. The row and column selecting signals from the X decoder 3 and the Y decoder 4 are also supplied to the memory cell array 2 for checking.

Furthermore, there are provided a data input and output circuit 6 for inputting data into and outputting it from an external device via data terminals 23a-23i in order to input and output the data, an error correction coding circuit 7 for receiving the information bits provided via the data input and output circuit 6 to generate the check bits according to a predetermined generation matrix, thereby adding the generated check bits to the provided information bits to pass them together, a writing/reading circuit 5 for writing the information bits from the error correction coding circuit 7 into the selected memory cells in the memory cell array 1 and also writing the check bits into the selected memory cells in the memory cell array 2 for checking, and for reading the information bits and check bits from the memory cells which are selected in data reading, and an error decoding circuit 8 for receiving the information bits and check bits provided from the writing/reading circuit 5 to check and correct an error of the read-out data (information bits and check bits) and then subsequently for providing the information bits (which are corrected) to the data terminals 23a-23i via the data input and output circuit 6. This semiconductor memory device is integrated onto a semiconductor chip 100.

Now, the operation of the semiconductor memory device having a x2 configuration, i.e. the configuration in which data are input or output in a 2-bit unit, will be described as an example. Further, the following matrix is considered as a generation matrix G employed in the error correction coding circuit 7.

$$G = \begin{pmatrix} 10110 \\ 01101 \end{pmatrix}$$

The following matrix is then considered as a check matrix H employed in the error decoding circuit 8.

$$H = \begin{pmatrix} 11100 \\ 10010 \\ 01001 \end{pmatrix}$$

In the above configuration, assuming that the information bits externally provided are D0, D1, while the check bits generated depending on the information bits are P1, P2, P3, a code word w capable of error checking and correcting is given as follows.

$$w = (D0, D1, P1, P2, P3)$$

$$= (D0, D1)G$$

$$= (D0, D1) \begin{pmatrix} 10110 \\ 01101 \end{pmatrix} \quad \text{(mod. 2)}$$

In the operation of the error decoding circuit 8 in accordance with the above described check matrix H, a syndrome s is generated from the read code word (a combination of information bits and check bits) following the expression below.

$$s = (S_0, S_1, S_2) = Hw^T$$

$$= \begin{pmatrix} 11100 \\ 10010 \\ 01001 \end{pmatrix} \begin{pmatrix} D0 \\ D1 \\ P1 \\ P2 \\ P3 \end{pmatrix} \quad \text{(mod. 2)}$$

When the syndrome s is not 0, it is identical to a column vector of the check matrix H. Therefore, error correction is carried out by checking which column vector in the check matrix H is equal to this syndrome and by inverting a bit value of the column corresponding to this column vector.

A relation between input and output of the above described coding and decoding is illustrated in FIG. 2. The operations of the data write-in and read-out of the conventional semiconductor memory device will be described hereinafter with reference to FIGS. 1 and 2.

The case in which 2-bit data (0, 1) are externally supplied via the data terminals 23a-23i is now considered. The external data (a code word) are transmitted to the error correction coding circuit 7 after waveform-shaped in the input and output circuit 6. The error correction coding circuit 7 generates check bits (1, 1, 0) from supplied information bits (0, 1) according to the above generation matrix G and adds the generated check bits to the supplied information bits to provide them to the writing/reading circuit 5. On the other hand, the X address and the Y address are respectively supplied to the X decoder 3 and the Y decoder 4 via the X address input terminals 21a-21m and the Y address input terminals 22a-22n. The X decoder 3 and the Y decoder 4 both decode the provided address to select their corresponding row and columns from the memory cell array 1 and the memory cell array 2 for checking. The information bits from the writing/reading circuit 5 are written in the selected memory cells of the memory cell array 1, while the check bits are written in the selected memory cells of the memory cell array 2 for checking. Accordingly, the information bits and the check bits are linked with each other to be stored in the memory cell array 1 and the memory cell array 2 for checking.

The reading operation will now be described. The X address and the Y address are supplied to the X decoder 3 and the Y decoder 4 via the address input terminals 21a-21m and 22a-22n, respectively. The X decoder 3 and the Y decoder 4 decode the supplied addresses to select their corresponding memory cells in the memory cell array 1 and the memory cell array 2 for checking. As a result, the information bits are read from the selected memory cells of the memory cell array 1, while the check bits are read from the memory cell array 2 for checking. The read-out information bits and check bits are supplied to the writing/reading circuit 5 and then to the error decoding circuit 8. The error decoding circuit 8 carries out the error checking and correction of the information bits and check bits from the supplied information bits and check bits in accordance with a table shown in FIG. 2. The case in which the read information bits are (0, 1) and the check bits are (1, 1, 0) is now considered. In such a case, no error exists in the read code word (information bits and check bits), so that the information bits (0, 1) are output from the error decoding circuit 8 so as to be transmitted to the outside of the device via the data input and output circuit 6 and the data terminals 23a-23i.

The case in which the information bits to be read (0, 1) are actually read (0, 0) in 1-bit error, due to a certain defect in the memory cells, noises or the like, will now be considered. In this case, since the check bits which are linked to the information bits to be stored and read out are (1, 1, 0), the error correction decoding circuit 8 corrects the read-out data (0, 0) to (0, 1) and then supplies them to the data input and output circuit 6 as shown in FIG. 2. In the case in which 1-bit error occurs only in the check bits from the memory cell array 2 for checking as well, no error exists in the information bits (0, 1) as shown in FIG. 2, so that the read information bits (0, 1) are supplied to the data input and output circuit 6 via the error decoding circuit 8.

As has been described, correct data reading can be carried out, and it can also be carried out even in the case that the data are read which are different from the originally written data due to some causes (the defects in a memory cell, noises etc.)

As mentioned above, the conventional semiconductor memory device having the error correcting function allows occurrence of the check bits and addition of the check bits to information bits according to the predetermined generation matrix and check matrix, for error checking and correction in the read-out code word (information bits and check bits). Therefore, if the information bits externally provided are established, the check bits added corresponding thereto are uniquely determined. And also a read code word, the data to be output from the error decoding circuit 8 are uniquely determined according to the check matrix. Therefore, the error correction coding circuit 7 and the error decoding circuit 8 are implemented on a hardware basis employing logic gates in the conventional semiconductor memory device. The detailed configurations of the error correction coding circuit and the error decoding circuit will then be described.

FIG. 3 is a diagram illustrating the detailed configurations of the error correction coding circuit and the error decoding circuit in a logic level when the semiconductor memory device inputs and outputs data in a 2-bit unit. Referring to FIG. 3, the error correction coding circuit 7 comprises an XOR gate X1 for receiving information bits D0, D1 externally provided, a signal line S1 for passing the information bit D0 externally provided, and a signal line S2 for passing the information bit D1 externally provided. An XOR gate X1 output provides a check bit P1, and the signal line S1 supplies a check bit P2 while the signal line S2 applies a check bit P3.

The error decoding circuit 8 comprises five XOR gates X2-X6, two inverters I1, I2, and two AND gates A1, A2. The XOR gate X2 receives the information bits D0, D1 from the memory cell array 1 and the check bit P1 from the memory cell array 2 for checking. The XOR gate X3 receives the information bit D1 and the check bit P2. The XOR gate X4 receives the information bit D1 and the check bit P3. The inverter I1 receives the XOR gate X3 output. The inverter I2 receives the XOR gate X4 output. The AND gate A1 receives the XOR gate X2 output, the XOR gate X3 output and the inverter I2 output. The AND gate A2 receives the XOR gate X2 output, the inverter I1 output and the XOR gate X4 output. The XOR gate X5 receives the information bit D0 and the AND gate A1 output. The XOR gate X6 receives the information bit D1 and the AND gate A2 output. The corrected information bits D0, D1 through the XOR gates X5, X6, ie. are to be supplied to the data input and output circuit 6. By implementing the error correction coding circuit and error decoding circuit on a hardware basis as described above, error checking and correction can be carried out more rapidly than on a software basis.

However, when a circuit for an error checking/correcting code is configured on a hardware basis as has been described, it includes a number of logic gates, so that when an operating supply potential thereof fluctuates, the potential level of each logic gate output fluctuates. Accordingly, a problem arises that the speed of logic operation on the data decreases and an erroneous logical operation is also carried out. This problem will be described in detail with reference to FIG. 4.

Referring to FIG. 4, the XOR gate X1 included in the error correction coding circuit comprises a CMOS inverter stage formed of a p channel MOS transistor T1 and an n channel MOS transistor T2, and a CMOS inverter stage formed of a p channel MOS transistor T3 and an n channel MOS transistor T4. The inverter stage formed of the transistors T1, T2 receives the information bit D0. The inverter stage formed of the transistors T3, T4 receives the information bit D1. Further, the XOR gate X1 comprises a pass transistor T5 which is turned on responsive to the output of the inverter stage formed of the transistors T3, T4 so as to pass the output of inverter stage formed of the transistors T1, T2, a pass transistor T6 which is turned on responsive to the output of inverter stage formed of the transistors T3, T4 so as to pass the information bit D0, a pass transistor T7 which is turned on responsive to the information bit D1 so as to pass the output of the inverter stage formed of the transistors T1, T2, a pass transistor T8 which is turned on responsive to the information bit D1 output so as to pass the information bit D0, and an inverter I3 for inverting the output of the pass transistor T8 to be output.

Similarly, the error decoding circuit 8 comprises a logic gate formed of MOS transistors. The XOR gate X2 comprises a CMOS inverter stage formed of the transistors T10, T11, a CMOS inverter stage formed of the transistors T12, T13, a CMOS inverter stage formed of the transistors T14, T15, and pass transistors T16-T23. The inverter stage formed of the transistors T10, T11 receives the check bit P1. The inverter stage formed of the transistors T12, T13 receives the information bit D0. The inverter stage formed of the transistors T14, T15 receives the information bit D1. The pass transistors T16, T17 are turned on responsive to the output of the inverter stage formed of the transistors T12, T13. The pass transistors T18, T19 are turned on responsive to the information bit D0. The pass transistors T20, T21 are turned on responsive to the output of the inverter stage formed of the transistors T14, T15. The pass transistors T22, T23 are turned on responsive to the information bit D1. The output of the XOR gate X2 is output via the inverter I4.

The XOR gate X4 comprises a CMOS inverter stage formed of the transistors T40, T41, pass transistors T42, T43 which are turned on responsive to the output of the inverter stage formed of the transistors T14, T15, pass transistors T44, T45 which are turned on responsive to the information bit D1, an inverter I6 provided in an output portion.

The inverter I1 comprises a CMOS inverter formed of the transistors T50, T51.

The inverter I2 comprises a CMOS inverter formed of the transistors T52, T53.

The AND gate A1 comprises input transistors T60, T61 and T62, load transistors T63, T64 and T65, a CMOS inverter stage formed of MOS transistors T66, T67 provided at the output portion.

The AND gate A2 comprises input transistors T71, T72 and T73, load transistors T74, T75 and T76, and an inverter stage formed of the transistors T77, T78 in the output portion.

The XOR gate X5 comprises a CMOS inverter stage formed of the transistors T80, T81, an inverter I7 for receiving the output of the AND gate A1, pass transistors T82, T83 which are turned on responsive to the output of the inverter I7, pass transistors T84, T85 which are turned on responsive to the output of the AND gate A1, and an inverter I8 provided at the output stage. The corrected information bit D0 is output from the inverter I8.

The XOR gate X6 comprises a CMOS inverter stage formed of the transistors T90, T91, an inverter stage I9 for receiving the output of the AND gate A2, pass transistors T92, T93 which are turned on responsive to the output of the inverter I9, pass transistors T94, T95 which are turned on responsive to the output of the AND gate A2, and an inverter I10 provided at the output stage. The corrected information bit D1 is output from the inverter I10.

Sense amplifiers 9 for sensing and amplifying the read-out information are provided between the memory cell array 1 for information bits and the memory cell array 2 for check bits, and the error coding circuit.

An operating margin on the high potential side of the semiconductor memory device is usually specified as 4V to 6V, for example. The operating margins on the high potential sides of the memory cell arrays 1, 2 are set at 3V to 7V larger than the operating margin of this semiconductor memory device. However, since the operating margins of the high potential sides of the error correction coding circuit and the error decoding circuit are narrow at 4V to 6V, the entire operating margin on the high potential side of the semiconductor memory device is determined by the high potential side operating margin of this error correcting circuit configuration.

The case that the operation supply potential $V_{cc}$ is lowered from 5V to 4V for some reason is now considered, for example. In this case, each XOR gate includes inverter stages, and pass transistors controlled responsive to the output of the inverter stages. Therefore, if the operation supply potential $V_{cc}$ is lowered to 4V, for example, the "H" level of the inverter stage output is lowered, as the inverter stage output level applied to the gate of each pass transistor is also lowered. Each pass transistor can only transmit a voltage equal to the difference between the voltage applied to each gate and each inherent threshold voltage. Therefore, a signal potential transmitted from the pass transistor is made further lower than 4V by the threshold voltage of this transistor. Since a plurality of stages of such pass transistor are provided, the output of the pass transistor on the output side of each XOR gate is further lowered. The lowered potential level of this output signal is further transmitted in the decoding circuit through the inverter stages and the pass transistors, so that the potential level of this signal is further lowered. The operation rate in each logic gate is reduced due to the lowering of the potential level of this signal. As for the operation rate in the inverter stage for example, the higher the supply potential is, the greater the charging rate of the output thereof is, so that an access rate is increased; on the other hand, the lower supply potential reduces the charging at the output of the inverter, so that the access rate is decreased. Furthermore, it is considered that when an input potential applied to each logic gate reaches near an input logic threshold thereof, each logic gate cannot carry out a correct logical operation, thereby transmitting an erroneous signal level as an output signal.

Therefore, despite the provision of the circuitry for correcting the error of the data in the memory device as described above, some disadvantages arise that the operating margin on the lowered potential side of the circuitry for error checking/correcting is narrow, so that the correct decision and correction of the data cannot be carried out, and/or the decision operation thereof proceeds slower.

Namely, when the circuitry for checking and correcting the error of information is implemented on a hardware basis employing the logic gates, the disadvantages arise that the operating margin on the lowered potential side in the semiconductor memory device is narrowed, and the correct error checking/correction of information cannot be carried out, and/or that the decision operation thereof proceeds slower, so that the access time of the semiconductor memory device is reduced.

In a computer system, the configuration in which a circuit for error checking/correction provided external to a main memory is formed in a ROM implementation, is disclosed in Japanese Patent Laying-Open No. 61-101857. It is an object of this prior art to reduce the amount of hardware when circuits for error checking/correction, i.e. a check bit generating circuit and an error checking/correcting circuit, are formed of logic gates such as XOR gates, AND gates etc. For this purpose, the check bit generating circuit and the error checking/correcting circuit are formed employing a ROM "which is commonly and widely used and is available at a low cost". Accordingly, this prior art only intends to improve an error checking/correcting-dedicated circuit provided external to the memory device, but not a circuit for error checking/correction included in the semiconductor memory device, and further, it recognizes none of the problems inherent to the semiconductor memory device having the above described error checking/correcting functions.

SUMMARY OF THE INVENTION

It is an object of the present invention to enlarge an operation supply voltage margin of a semiconductor memory device having error checking/correcting functions, thereby providing a semiconductor memory device capable of carrying out the precise and rapid error checking/correction of information even if the fluctuation of the operation supply voltage occurs.

It is another object of the present invention to provide a semiconductor memory device having correct and rapid error checking/correcting functions even if the supply voltage of a high potential is lowered.

It is a further object of the present invention to make the operation supply voltage margin of a circuit for error checking/correction included in a semiconductor memory device as large as the operating supply voltage margin of a memory cell portion included in the semiconductor memory device, thereby enlarging the entire operating supply voltage margin in the semiconductor memory device.

A semiconductor memory device having error checking/correcting functions according to the present invention, comprises an error correction coding circuit and an error correction decoding circuit, at least one of which is formed in a masked ROM implementation. That is, the semiconductor memory device with error checking/correcting function according to the present invention includes the error correction coding circuit for receiving information externally given (information bits) to generate associated check bits, and for outputting the received information bits and the generated checked bits linked to each other, and the error correction decoding circuit for reading information bits and the check bits linked to the information bits from memory cells selected in response to an external address, and for outputting the information bits after the error checking and correction for the read-out bit data are carried out, at least one of which is formed in the masked ROM implementation. The masked ROM employs given data as an address for storing the data or for reading out data.

The error correction coding circuit portion or the error correction decoding circuit portion in the masked ROM implementation according to the present invention can be of the same circuit configurations as those of a memory cell array portion and a peripheral circuit portion (including a memory cell array for checking) in this semiconductor memory device. Therefore, even if the operation supply potential fluctuates, the order of the deviation of the output potential level thereof can be set the same as the orders of the memory cell array portion and the peripheral circuit portion thereof, since no stages of logic gates (particularly XOR gates) are provided in the error checking/correcting circuitry. Accordingly, the supply voltage margin of the error correction coding circuit portion or that of the error correction decoding circuit portion can be made the same as that of the memory cell array portion, so that the large operation supply voltage margin of the entire semiconductor memory device can be implemented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a table showing the relation between an input and output upon coding and decoding for error checking/correction in the semiconductor memory device;

FIG. 8A is a diagram illustrating one example of the equivalent circuit of the masked ROM;

FIG. 8B illustrates a planar layout of the masked ROM shown in FIG. 8A;

FIG. 8C is a cross sectional view taken along lines X—X' in FIG. 8B;

FIGS. 9A and 9B are schematic diagrams illustrating the cross sectional structure and the equivalent circuit of a FAMOS cell when used as a memory cell in a memory cell array; and FIGS. 10A and 10B are diagrams illustrating the cross sectional structure and the equivalent circuit of a DRAM cell when used as the memory cell structure of the memory cell array.

DESCRIPTION OF THE PREFERRED EMBODIMENTS

Figure 1:
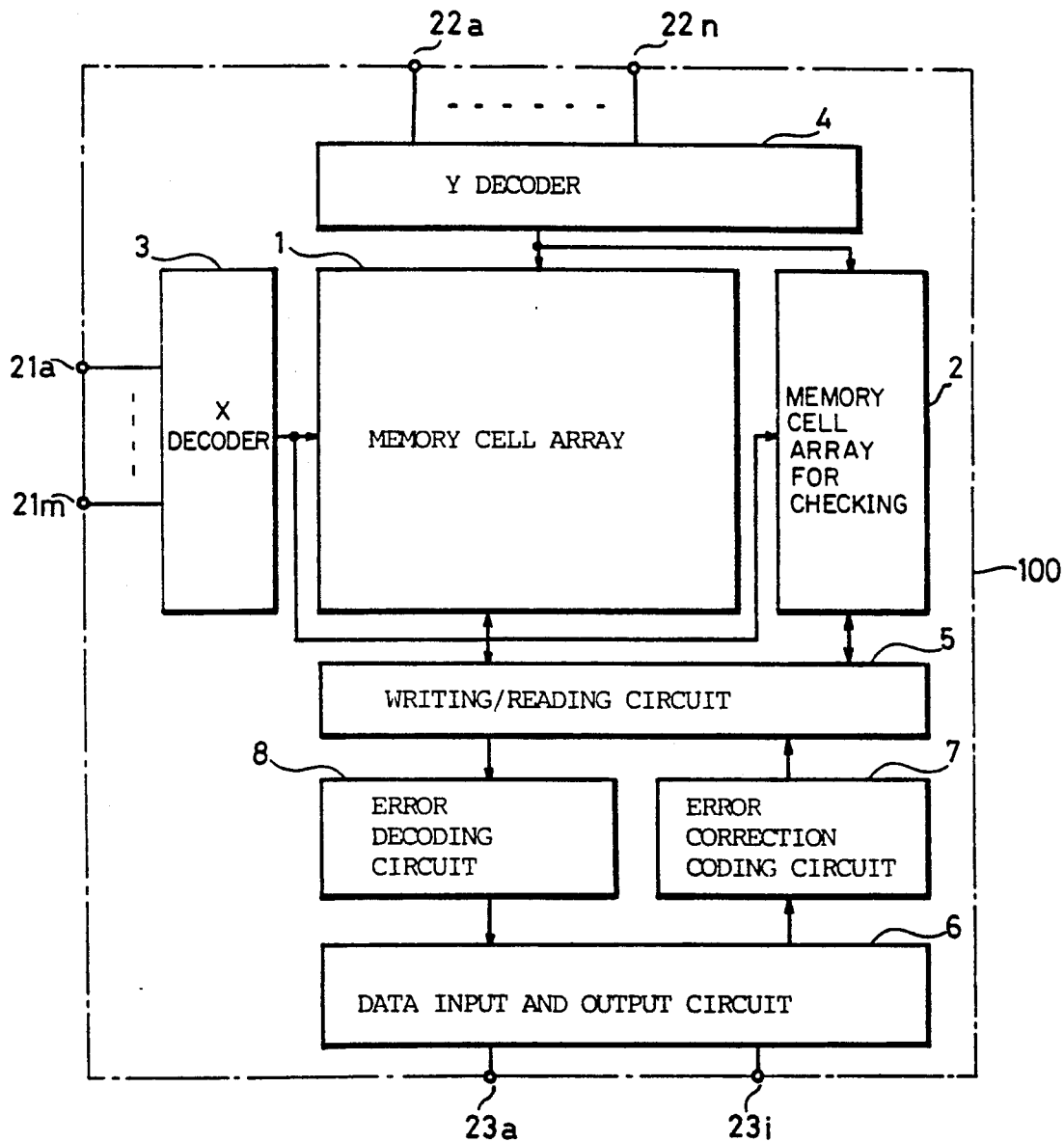
FIG. 1 is a schematic diagram illustrating the entire configuration of a conventional semiconductor memory device.
Figure 3:
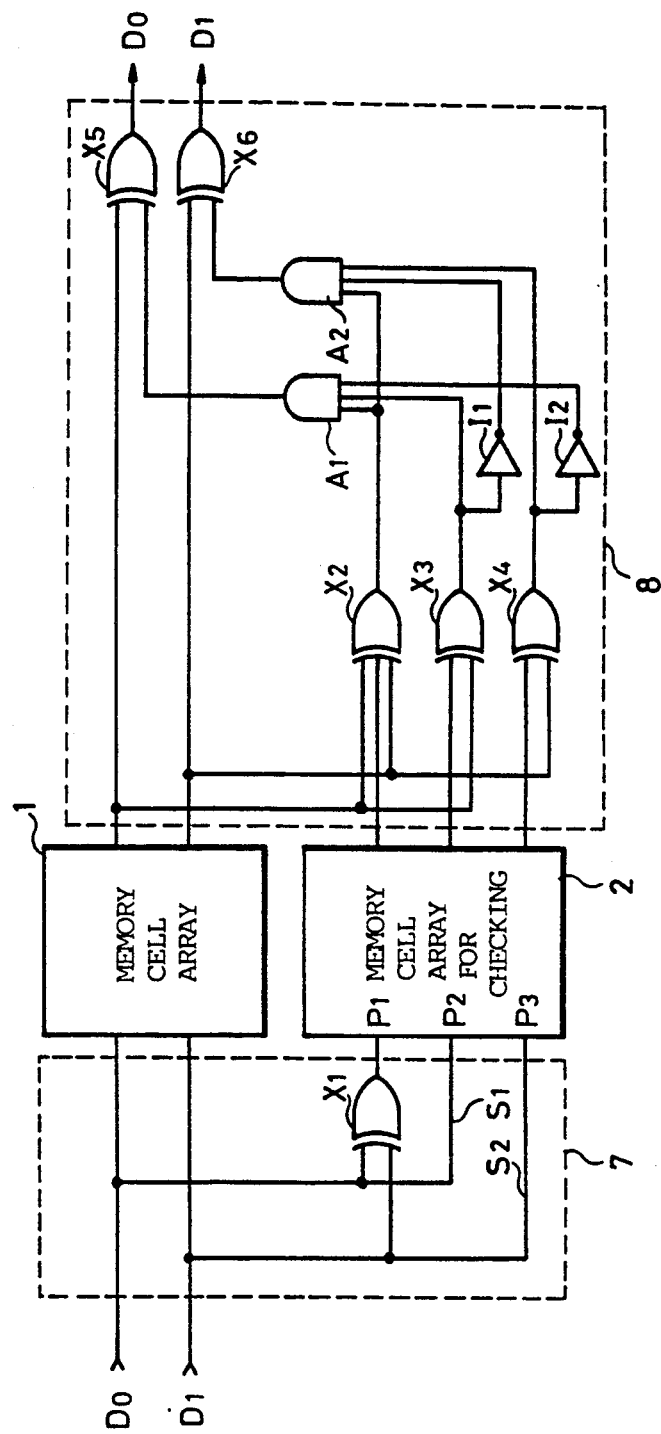
FIG. 3 is a diagram illustrating in a logic level one example of the configurations of an error correction coding circuit and an error decoding circuit in the conventional semiconductor memory device in accordance with the table of FIG. 2.
Figure 4:
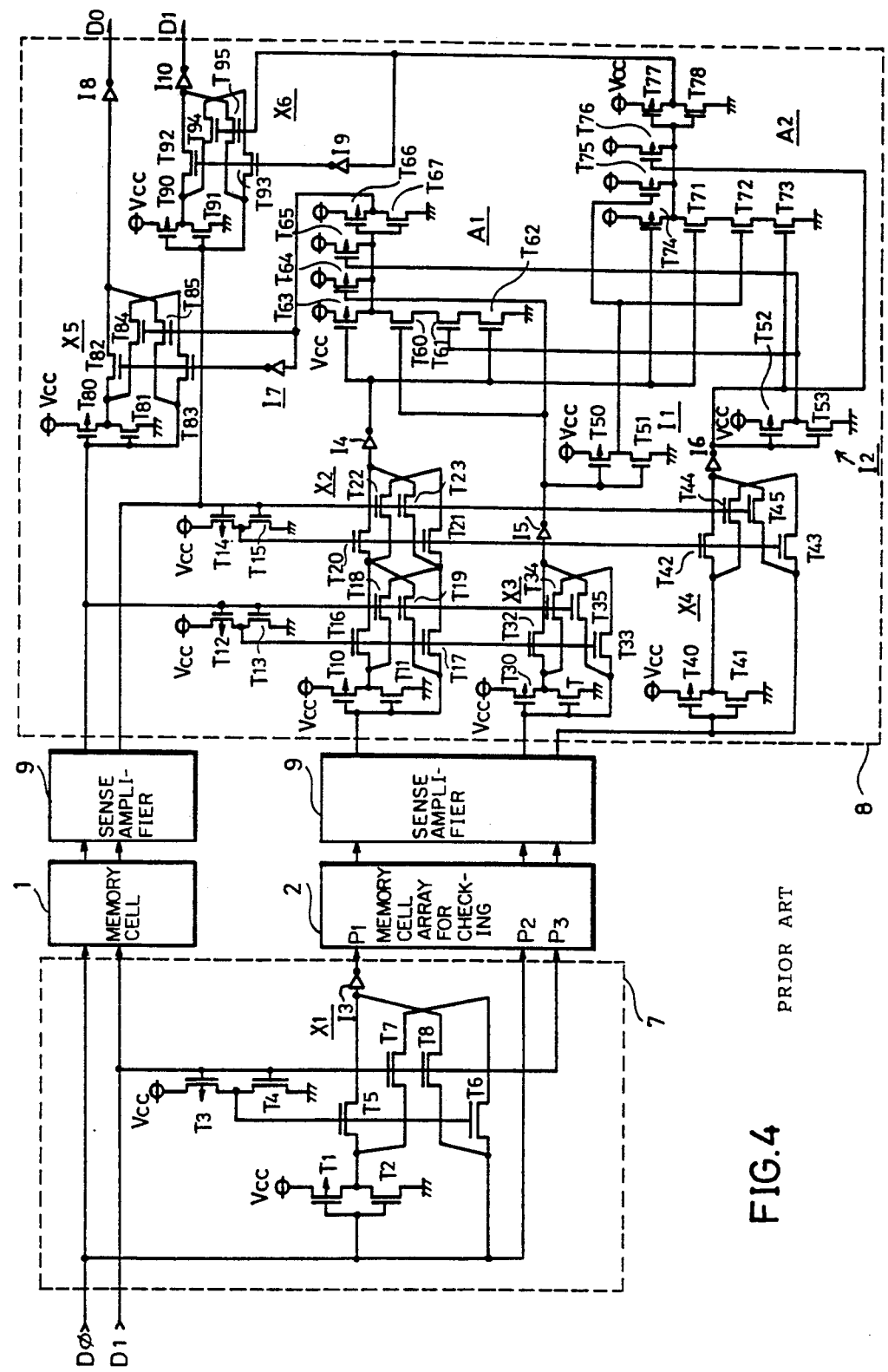
FIG. 4 is a circuit diagram illustrating more detailed circuit configurations of the error correction coding circuit and the error decoding circuit shown in FIG. 3.
Figure 5:
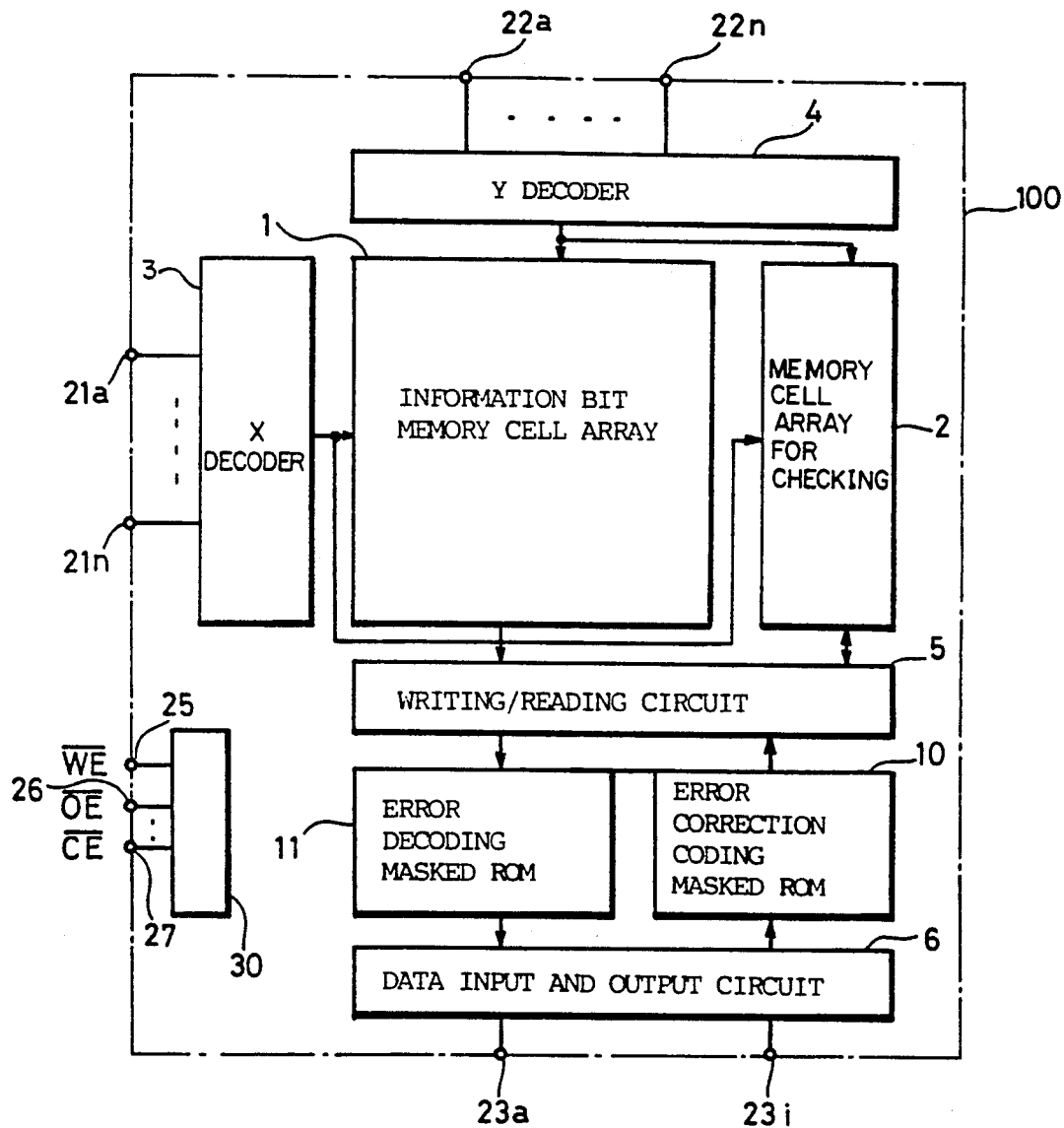
FIG. 5 is a schematic block diagram illustrating the entire configuration of the semiconductor memory device of on embodiment of the present invention.

FIG. 5 is a schematic block diagram illustrating the entire configuration of a semiconductor memory device of one embodiment of the present invention. Referring to FIG. 5, the semiconductor memory device of one embodiment of the present invention is formed integrated on a semiconductor chip 100. In order to input and output signals, there are provided on the semiconductor chip 100, X address input terminals 21a-21m, Y address input terminals 22a-22n, data input and output terminals 23a-23i, and control signal input terminals 25-27.

A control signal generating circuit 30 is supplied with control signals: $\overline{WE}$ (a write enable signal), $\overline{OE}$ (an output enable signal) and $\overline{CE}$ (a chip enable signal) which are respectively supplied through the control signal input terminals 25-27. The control signal generating circuit 30 generates various types of control signals for controlling the operations of the semiconductor memory device in response to the signals: the signal $\overline{WE}$ for designating the writing/reading operation mode of the semiconductor memory device, the output enable signal $\overline{OE}$ for providing the data writing/reading operation timing, and the signal $\overline{CE}$ for indicating selection/non-selection of the semiconductor memory device. These control signals generated by the control signal generating circuit 30 differ from one another whether the semiconductor memory device is EEPROM, DRAM or SRAM.

An X address supplied through the X address input terminals 21a-21m is supplied to an X decoder 3. The X decoder 3 selects corresponding rows of a memory cell array for information bits 1 and a memory cell array 2 for checking responsive to the supplied X address. A Y address supplied to the Y address input terminals 22a-22n is supplied to a Y decoder 4. The Y decoder 4 selects corresponding columns from the information-bit memory cell array 1 and the checking memory cell array 2 responsive to the supplied Y address.

The data input and output terminals 23a-23i are coupled to a data input and output circuit 6. The data input and output circuit 6 waveform-shapes the given data for supplying external information bits to an error correction coding masked ROM 10 in data writing, and also waveform-shapes the data from an error decoding masked ROM 11 to be sent to the data input and output terminals 23a-23i in data reading.

The error correction coding masked ROM 10 employs information (information bits) supplied from the data input and output circuit 6 as an address, and prestores check bits corresponding to the supplied information bits (see FIG. 2) so as to link the supplied information bits and the check bits in the masked ROM implementation to be supplied to a writing/reading circuit 5.

The writing/reading circuit 5 writes the information bits and check bits supplied from the error correction coding masked ROM 10 into the respective memory cells selected from the information bit memory cell array 1 and the memory cell array 2 for checking.

The error decoding masked ROM 11 receives the information bits and the check bits from the memory cells selected in reading data via the writing/reading circuit. The error decoding masked ROM 11 employing the supplied information bits and check bits as an address thereof, stores the corresponding information bits and check bits of its address in a masked ROM implementation.

In data writing/reading in the semiconductor memory device, when input data are given, the check bits or information bits to be generated are uniquely determined in accordance with a check matrix or a generation matrix. Therefore, if each of the error correction coding circuit and the error decoding circuit is implemented in the masked ROM implementation, and the input data are used as the address signal of each masked ROM, the desired check bits and/or information bits can be easily generated.

Figure 6:
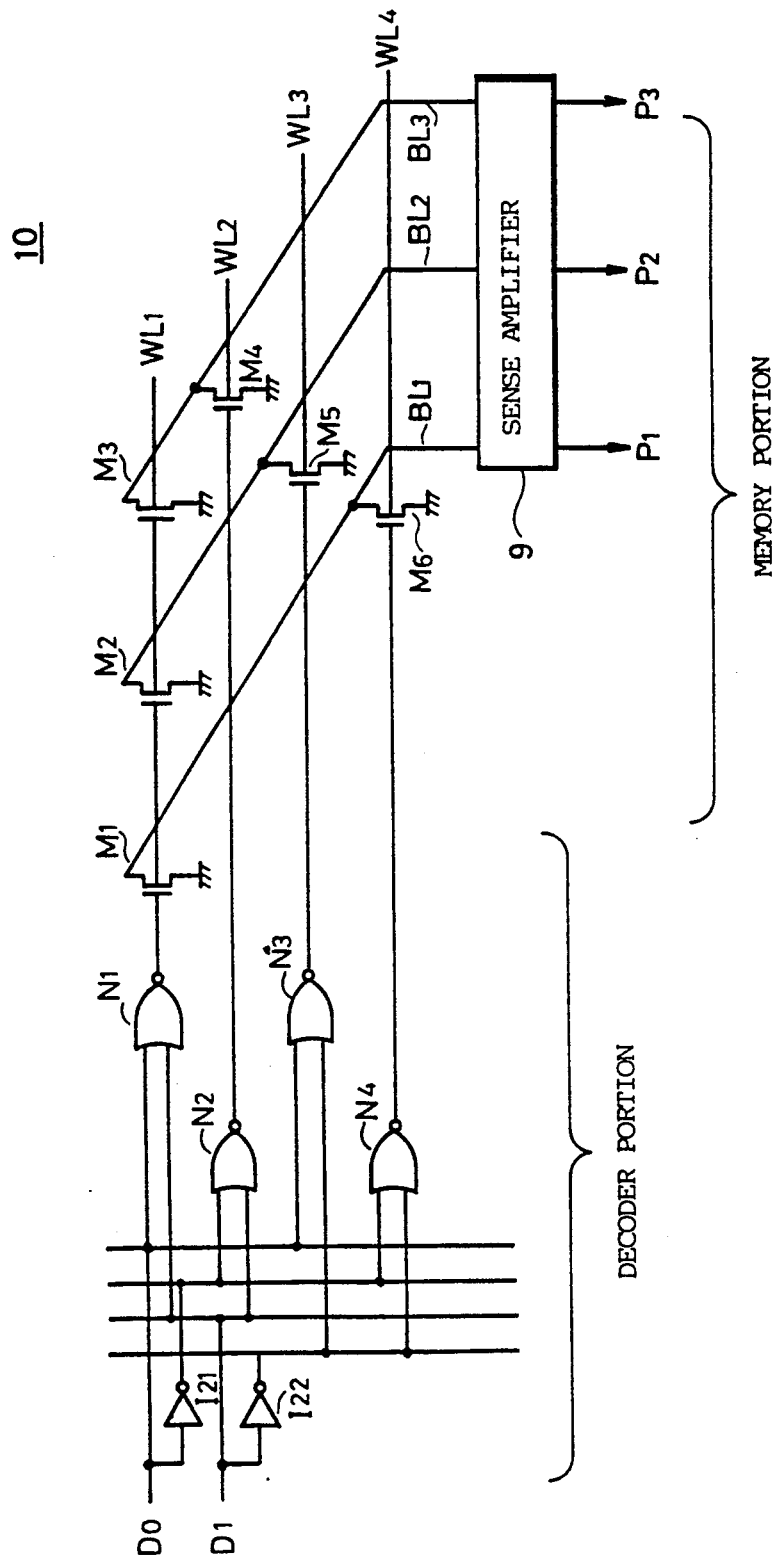
FIG. 6 is a diagram illustrating one example of the detailed configuration of an error correction coding masked ROM in a semiconductor memory device of one embodiment of the present invention.

FIG. 6 is a diagram illustrating one example of the detailed configuration of the error correction coding masked ROM 10 according to one embodiment of the present invention. Referring to FIG. 6, the error correction coding masked ROM 10 comprises a decoder portion for decoding supplied information bits D0, D1, and a ROM memory portion for prestoring check bits corresponding to input information. FIG. 6 illustrates the configuration in which the information bits are 2 bits, while the check bits are 3 bits, and also illustrates one example in which the same generation matrix as the one shown in the table of FIG. 2 is employed as the generation matrix used for generating the check bits thereof. The decoder portion comprises an inverter I21 for receiving the information bit D0, and inverter I22 for receiving the information bit D1, and four NOR gates N1-N4. The NOR gate N1 receives the information bits D0 and D1. The NOR gate N2 receives an inverter I21 output and the information bit D1. The NOR gate N3 receives the information bit D0 and an inverter I22 output. The NOR gate N4 receives the inverter I21 output and the inverter I22 output. The outputs of the NOR gates N1-N4 are respectively connected to word lines WL1-WL4 in the ROM memory portion.

In the ROM memory portion, memory transistors M1-M6 are arranged to provide a "1", "0" pattern identical to a submatrix corresponding to the matrix for generating check bits in the generating matrix G. Also in the ROM memory portion, each memory transistor is provided at the intersection of each word line and bit line, and hence is configured such that information "0", "1" is stored according to the thickness of a gate oxide film of each memory transistor. However, the configuration shown in FIG. 6 only illustrates the memory transistors M1-M6 for storing information "0", of which gate oxide films are made thin. As will be described in detail, the memory transistors M1, M2 and M3 are respectively provided at the intersections of the word line WL1 and the bit lines BL1-BL3 in the ROM memory portion. The memory transistor M4 is provided at the intersection of the word line WL2 and the bit line BL3. The memory transistor M5 is provided at the intersection of the word line WL3 and the bit line BL2. The memory transistor M6 is provided at the intersection of the word line WL4 and the bit line BL1. The bit lines BL1-BL3 are all connected to a sense amplifier 9. After the sense amplifier 9 detects the potentials on the outputs of the bit lines BL1-BL3, it amplifies them to provide output as check bits P1-P3. That is, the signal level on the bit line BL1 supplies the check bit P1, while the signal level on the bit line BL2 supplies the check bit P2, and the signal level on the bit line BL3 supplies the check bit P3.

Figure 7:
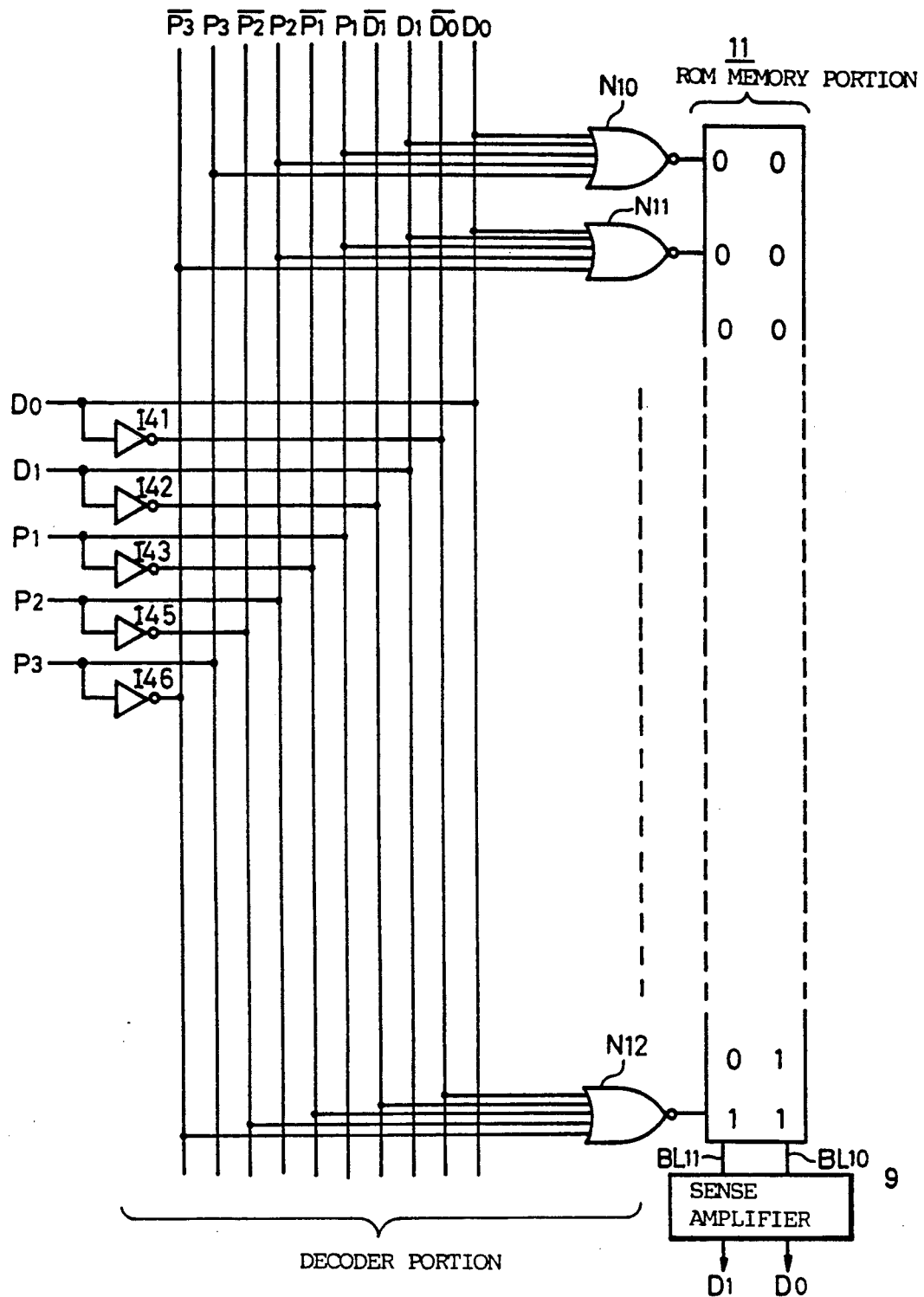
FIG. 7 is a diagram illustrating in detail one example of the configuration of the error decoding masked ROM in the semiconductor memory device of one embodiment of the present invention.

FIG. 7 is a diagram illustrating one example of the detailed configuration of the error decoding masked ROM in the semiconductor memory device of one embodiment of the present invention. The configuration shown in FIG. 7 also illustrates one example of the decoding which is identical to the one shown in the table of FIG. 2. Referring to FIG. 7, the error decoding masked ROM 11 comprises a decoder portion and a memory portion. The decoder portion comprises five inverters I41-I46 and 32 NOR gates N10-N12. In this case, the information bits are of 2 bits, while the check bits are of 3 bits. This decoder portion is of an NOR-type decoder configuration; that is, the configuration for generating complementary information data $\overline{D0}$, $\overline{D1}$ and $\overline{P1}$-$\overline{P3}$ from input information D0, D1 and P1-P3, decoding in the respective NOR gates N10-N12 and selecting the corresponding word line from ROM memory portion. For example, the NOR gate N10 receives information bits D0, D1, and check bits P1, P2 and P3. The NOR gate N11 receives the information bits D0, D1, the check bits P1, P2, and an inverted bit $\overline{P3}$. The NOR gate N12 receives the output of each inverter I41-I42, i.e. inverted information bits D0, D1, and inverted check bits $\overline{P1}$-$\overline{P3}$.

In the ROM memory portion, read-out information bits corresponding to input information D0, D1, P1-P3 are stored in the ROM implementation. That is, this ROM memory portion has such configuration that 32 word lines and two bit lines are provided for each NOR gate N10-N12, and a memory transistor of which the thickness of a gate oxide film is determined according to the stored information, is provided at the intersection of each word line and bit line. A bit line output is supplied to the sense amplifier 9, and then after amplified therein, it is output as read-out information D0, D1. The operation thereof will be briefly described hereinafter.

The case that information (information bits) externally given via data input and output terminals 23a-23i are assumed to be (1, 0) is now considered. In the error correction coding ROM 10, the output of the NOR gate N3 only goes to the "H" level responsive to the supplied information bits (1, 0), while the outputs of the NOR gates N1, N2 and N4 fall to the "L" level. As a result, the potential of the word line WL3 rises, and the memory transistor M5 is turned on. Consequently, the potential on the bit line BL2 is discharged to the "L" level, while the outputs of the other bit lines BL1, BL3 go to the "H" level, which is already precharged to that level. The potentials appeared on the bit lines BL1, BL2 and BL3 of (H, L, H), i.e. (1, 0, 1) are output as check bits P1-P3 after sensed and amplified by the sense amplifier 9. In the foregoing description, a precharge path of each bit line BL1-BL3 is the same as the one provided in a usual ROM circuit and therefore, it is omitted to avoid the complexity of the drawings. The check bits P1, P2 and P3 of (1, 0, 1) generated via the sense amplifier 9 are linked to the information bits D0, D1 to be supplied to the writing/reading circuit 5. The writing/reading circuit 5 writes the information bits and the check bits into the respective memory cells in the information memory cell array 1 and the memory cell array 2 for checking already selected via the X decoder 3 and the Y decoder 4. One cycle of the writing operation is thus completed.

In the illustration for the above described data writing operation, the configuration of FIG. 6 does not illustrate the one for outputting the information bits D0, D1; however, it may be the one for passing the information bits D0, D1 unchanged, and further, it may be the one for storing the information bits corresponding to these information bits in the ROM memory portion.

On this data write-in path, the decoder portion is of an NOR-type decoder configuration, which is the same as those of the X decoder 3 and the Y decoder 4 provided in the memory cell array portion, so that the operation supply voltage margin of this error correction coding masked ROM can be as large as the one provided corresponding to the memory cell array portion. If the operation supply voltage is lowered, the lowering of the operation supply potential appears on the NOR gate output; however, this output is transmitted onto the word line, which operation is the same as the word line selecting operation in a common memory cell array portion. Therefore, the operation margin thereof can be made the same as that of the memory cell array portion. Accordingly, the operating margin for the supply voltage can be improved more greatly than the circuit configuration employing a conventional logic gate.

In the foregoing description, the selecting operation of the memory cells in the memory cell array 1 and the memory cell array 2 for checking has not been described; however, after the X address and the Y address are respectively inputted into the X decoder 3 and the Y decoder 4 in response to a control signal $\overline{CE}$ which is externally provided, the selecting operation for the memory cell array is carried out responsive to a control signals from the control signal generating circuit 30. The write-in command of data is carried out responsive to control signals $\overline{WE}$ and $\overline{OE}$. That is, when the write enable signal $\overline{WE}$ is active "L", while the output enable signal $\overline{OE}$ is inactive "H" in data writing, the data is inputted in the data input and output circuit 6 and then transmitted to the error correction coding masked ROM 10. The data reading operation will now be described.

After the X address and the Y address are respectively supplied to the X decoder 3 and the Y decoder 4 responsive to the external control signal CE and then are decoded therein, the corresponding memory cells are selected from the memory cell array 1 and the memory cell array 2 for checking, so that the information bits and check bits therein are read-out. Those read-out information bits and check bits are supplied to the error decoding masked ROM 11 via the writing/reading circuit 5. The error decoding masked ROM 11 employs the supplied information bits D0, D1 and the check bits P1-P3 as address inputs thereof so as to read out the corresponding information fixedly stored, or held in the ROM implementation. That is to say, when the information bits are (1, 0), and the check bits are (1, 0, 1), for example, (1, 0) is already stored in the masked ROM implementation corresponding to an address (1, 0, 1, 0, 1), and a word line corresponding to this address is selected, so that the contents thereof are transmitted as read-out information D0, D1 to the data input and output circuit 6 via the sense amplifier 9. The data input and output circuit 6 outputs the given data as read-out data in response to the control signals $\overline{WE}$, $\overline{OE}$. Whenever one-bit error arises due to some causes, i.e. when the read-out bits from the memory cell array 1 and the memory cell array 2 for checking are (1, 1, 1, 0, 1) (the information bit D0 is erroneous), (0, 0, 1, 0, 1) (the information bit D1 is erroneous), (1, 0, 0, 0, 1) (the check bit P1 is erroneous), (1, 0, 1, 1, 1) (the check bit P2 is erroneous), or (1, 0, 1, 0, 0) (the check bit P3 is erroneous), the written-in information (1, 0) is in the masked ROM implementation, so that correct data reading is carried out by the error decoding circuit 11. That is, the information reading in which the error of information is corrected, is thereby carried out.

Also in this data reading, the decoder portion of the decoding masked ROM 11 has the same NOR-type configuration as the decoder portion provided corresponding to the memory cell array portion, so that the supply voltage operation margin thereof can be made the same as the one for the memory cell array portion, and hence the entire operation supply voltage margin in the semiconductor memory device can be improved.

Similarly in the combination of the other information bits and check bits, corresponding information in the masked ROM is read-out by the decoder portion so as to be read-out via the data input and output circuit 6 after the error checking and correction of information are carried out.

FIGS. 8A to 8C illustrate one example of the configuration of a masked ROM. FIG. 8A illustrates one example of the circuit configuration of the masked ROM, while FIG. 8B illustrates a planar layout thereof, and FIG. 8C illustrates a part of the cross sectional structure thereof. In FIG. 8A, the masked ROM has memory transistors M10, M13 for storing information "0" have their gate oxide films made thin. Memory transistors M11, M12 with thick gate oxide film are further provided therein for storing information "1". The memory transistors M10, M11 are selected through a word line WL10, and information of each memory transistors M10, M11 is transmitted onto bit lines BL20, BL21. The memory transistors M12, M13 are selected through a word line WL11, and information of each memory transistor M12, M13 is transmitted onto the bit lines BL20, BL21.

Referring to FIG. 8B, the memory transistors M10 and M13 have their oxide films made thin, while the memory transistors M11, M12 have their gate oxide films made thick. The memory transistor with a thin gate oxide film has a low threshold voltage, while the one with a thick gate oxide film has a high threshold voltage. Therefore, if the same voltage is applied to the gates of the memory transistors via the word lines, the memory transistor with a thin gate oxide film is rendered conductive, while the other memory transistor with a thick gate oxide film remains non conductive. Accordingly, information "0" and "1" can be stored.

FIG. 8C is a cross sectional view illustrating the cross sectional structure taken along with lines X—X' shown in FIG. 8B. The memory transistor M12 for storing information "1" is formed of a source diffusion layer 201a and a drain diffusion layer 201b on a semiconductor substrate 200, a gate oxide film B of a large thickness thereon, and a gate electrode 203. The memory transistor M13 for storing information "0" is formed of a source diffusion layer 201c connected to a bit line, a drain diffusion layer 201b connected to a ground potential, a gate oxide film A of a small thickness thereon, and the gate electrode 203 to be a word line. As described above, information can be easily stored depending on only the thickness of the gate oxide films.

In addition, in place of this configuration, there is another configuration that information is stored depending on whether or not each of the gate electrodes and of the word lines are connected to one another, with the thickness of the gate oxide films unchanged and the thickness of the word lines and the gate electrodes kept constant.

FIG. 9A is a diagram illustrating a FAMOS cell structure employed as a memory cell in a memory cell portion in general. Referring to FIG. 9A, a FAMOS cell (an EPROM cell) is formed of impurity regions 301a, 301b which are source and drain diffusion layers formed on a semiconductor substrate 300, a floating gate 302 which is formed on the semiconductor substrate 300 through an interlayer insulation film 304 and stores information depending on whether or not a charge is stored therein, and a control gate 303 formed on the floating gate 302 through an interlayer insulation film 305.

Therefore, when the memory cell configuration of the memory cell array is the FAMOS cell structure shown in FIG. 9A, the ROM for error checking/correction coding and decoding can be formed in the same manufacturing steps as the memory cell transistors in the memory cell array, so that the manufacturing steps can be greatly simplified compared to those steps employing the conventional logic gates. That is, if the gate electrode of the thin gate oxide film portion is formed in the same manufacturing steps as that for the floating gate 302, while the gate electrode for the thick gate insulating film portion is formed in the same step as that for the control gate 303, the masked ROM can be easily formed without additional manufacturing steps. In such a case, if information is stored not depending on the thickness of the gate oxide film, but whether or not the gate electrodes and the word lines are connected to one another in the masked ROM, the masked ROM can be formed in the same manufacturing step as that of the control gate 303 or the floating gate 302 in the configuration of FIG. 9A.

Furthermore, even in the case that the structure of the memory cells included in these memory cell arrays 1, 2 is not the one of the FAMOS cells but of common DRAM cells (see FIG. 10A), and also in the case that information is stored depending on the thickness of the gate oxide films of the memory transistors of the ROM, or whether or not the gate electrodes and the contact electrodes exist, the memory transistors of the masked ROM can be formed in the same manufacturing steps as those of the transistors in the memory cell array portion. That is, referring to FIG. 10A, the gate electrodes of the ROM memory transistors can be formed in the same manufacturing steps as those of the gate electrode 400 of the DRAM cell or a cell plate 401 which is one electrode of an information storing capacitor. Accordingly, the ROM for error checking/correction in the masked ROM implementation can be easily formed without the complexity of the manufacturing steps. Now, referring to FIG. 10A, the DRAM cell is simply formed of a semiconductor substrate 405, an impurity diffusion region 406a to be a source, the other impurity diffusion region 406b to be a drain, a gate insulation film 407 and a cell plate 401.

The equivalent circuits of the FAMOS cell and the DRAM cell are respectively illustrated in FIG. 9B and FIG. 10B.

As described heretofore, according to the present invention, at least one of the error correction coding circuit portion and the error decoding circuit portion is formed in the masked ROM implementation in the semiconductor memory device comprising error checking/correcting functions, so that the configurations of the error correction coding and decoding circuit portions can be the same as those of the other portions of the semiconductor memory device; i.e. the memory cell array portion and the peripheral circuit portion relating thereto. Accordingly, the operation supply voltage margins of the error correction coding circuit portion and the decoding circuit portion can be enlarged as the operation supply margins in the memory portions of the information bits and in the check bits and the related peripheral circuit portion thereto. Consequently, a large operation supply voltage margin can be provided in the entire semiconductor memory device, so that such semiconductor memory device can be provided as to be able to carry out rapid and correct data reading despite the fluctuation of the supply voltage.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of making a non-volatile memory including a floating gate type memory cell, and a masked ROM including an insulated gate type transistor cell for storing fixed data, comprising the steps of:

forming a gate insulation layer on a substrate in the same manufacturing step for said floating gate type memory cell and said insulated gate type transistor cell, forming a floating gate layer for said floating gate type memory cell on said gate insulation layer, forming a second insulation layer on said floating gate layer, forming a control gate electrode layer on said second insulation layer for said floating gate type memory cell, and forming a gate electrode for said insulated gate type transistor cell in the same manufacturing step with forming of one of either said floating gate layer and said control gate electrode layer, wherein said step of forming a gate electrode includes a step of forming an additional insulation layer on said gate insulation layer in the same manufacturing step with forming said second insulation layer when the gate electrode is formed in the same manufacturing step with forming the control gate layer.

* * * * *